June 12, 1934.  W. H. C. RICHMAN  1,962,937
MOTOR SUSPENSION FOR MOTOR VEHICLES
Filed June 22, 1932  2 Sheets-Sheet 1
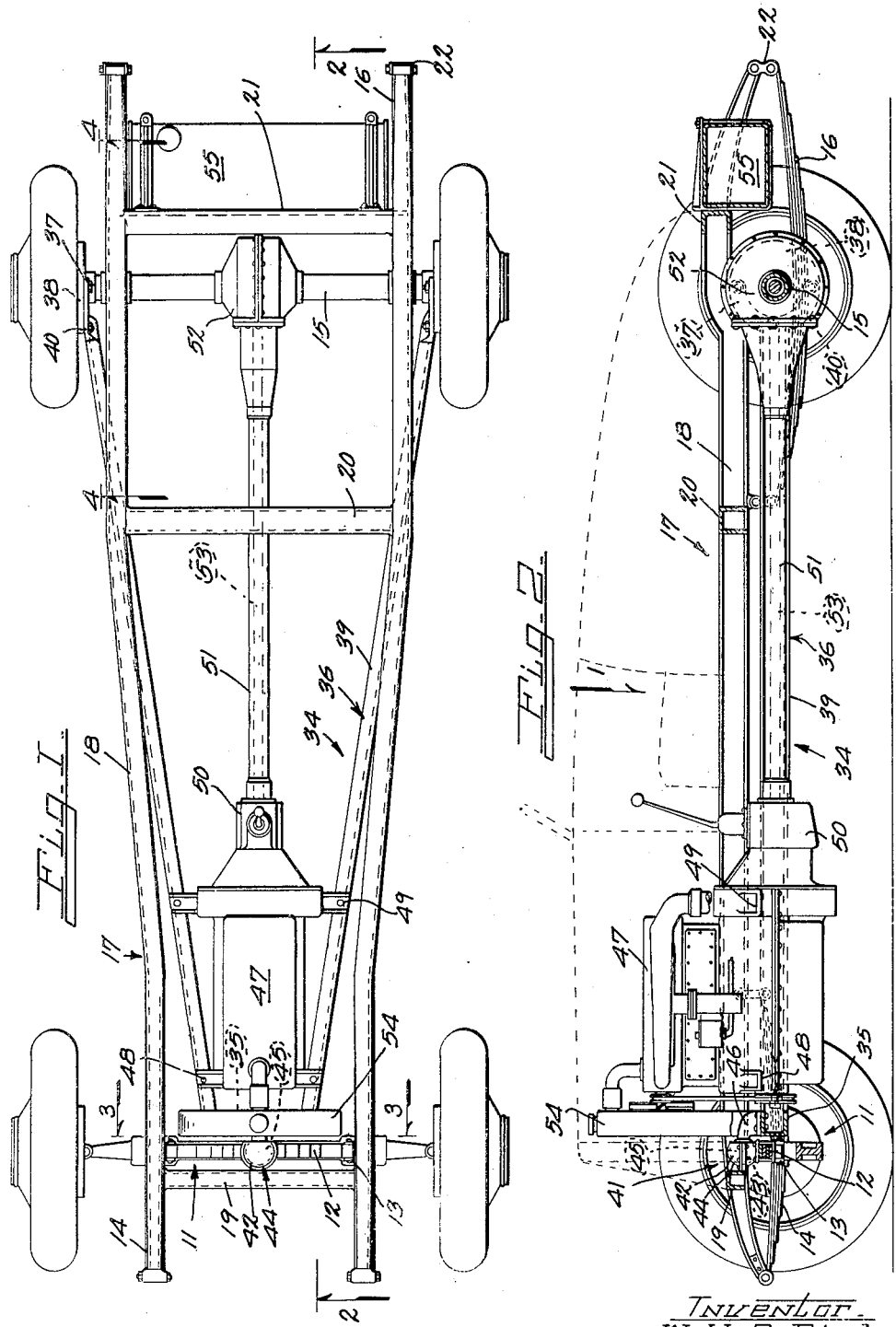
Inventor
W. H. C. Richman
By Hazard and Miller
Attorneys.

June 12, 1934. W. H. C. RICHMAN 1,962,937
MOTOR SUSPENSION FOR MOTOR VEHICLES
Filed June 22, 1932 2 Sheets-Sheet 2
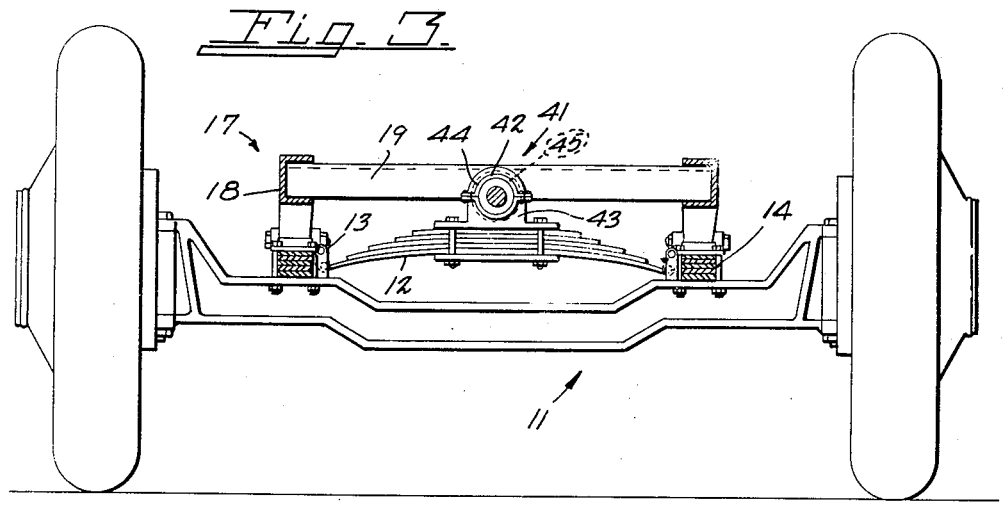
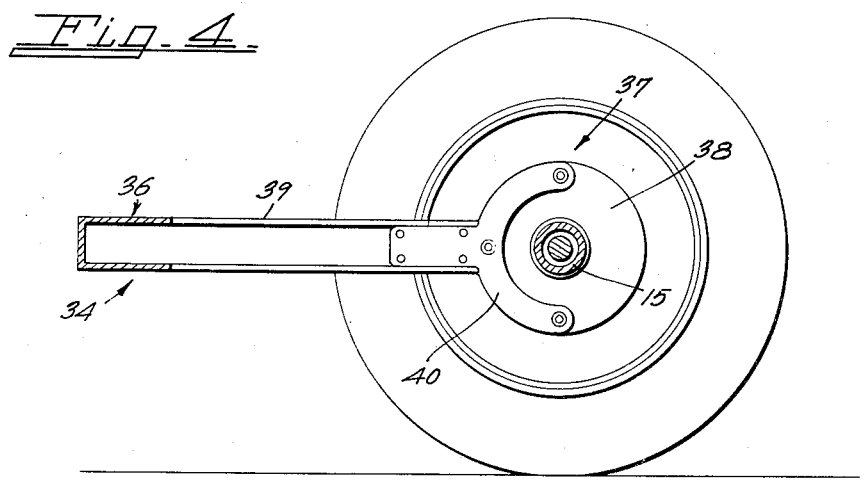
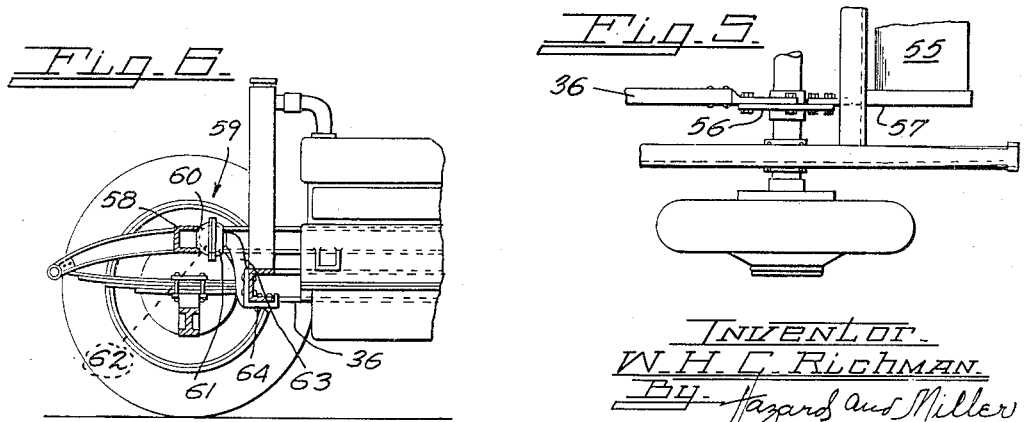
Inventor.
W. H. C. Richman
By Hazard and Miller
Attorneys.

Patented June 12, 1934

1,962,937

UNITED STATES PATENT OFFICE 1,962,937

MOTOR SUSPENSION FOR MOTOR VEHICLES

William H. C. Richman, Philadelphia, Pa.

Application June 22, 1932, Serial No. 618,655

5 Claims. (Cl. 180—58)

My invention relates to a manner of suspending an internal combustion motor to the front axle and a direct drive from the motor to the rear axle.

An object and feature of my invention is providing a suspension frame for an internal combustion engine in which the frame is spring supported at the front end by one or more springs connected to the front axle and at the rear end this frame is attached to the rear axle housing. The sides of the frame act as radius rods and a support for the motor. The drive from the motor to the rear axle may be by a straight shaft without universal joints, such shaft preferably passing through a drive shaft housing which is connected rigidly to the transmission housing and to the differential housing. An object of this construction is to provide a resilient support for the engine on the front axle, this support preferably being by a universal joint, such as a ball and socket joint, whereby the vibration of the engine may vibrate the radius rods forming the engine frame, but such vibration will be taken up by the spring suspension on the front axle. The engine frame, in fact, may undergo torque strains without transmitting these to the vehicle body.

A further object and feature of my invention is mounting both the engine and the radiator on this engine frame so that the radiator and engine would have the same vibration or torque without communicating this to the spring suspension on the front axle and, moreover, so that there will be no torque or vibrating action in the water connections between the engine and the radiator.

Another object and feature of my invention in providing the universal joint connection to the spring suspension for the engine frame is that road shocks, such as twists particularly, due to a wheel on one side striking a bump or a dip in the road, are not communicated to the engine frame. Thus the vehicle frame can be subjected to a more or less twisting action due to the irregularities of the road without this being communicated to the engine and radiator. With my construction, however, it is possible to make a more rigid vehicle frame and an X type of cross structure may be incorporated in the vehicle frame with the cross members extending substantially from one end to the other of the vehicle frame.

Another object and feature of my invention is mounting the vehicle body at the rear of the vehicle on a spring suspension, which suspension, preferably, is supported by shackles at both ends of the springs so that the rear springs do not transmit any driving force between the rear axle and the vehicle frame or vice versa.

Another object and feature in one form of my invention is the employment of a separate spring or springs to support the engine frame at the front axle, and a second set of springs connected to the front axle to support the front of the vehicle frame having the vehicle body thereon. By this latter construction and using the set of springs at the rear axle for the vehicle frame, the engine frame is entirely separate from the vehicle frame, each having their independent spring suspension.

In another construction I may connect the engine frame to the vehicle frame adjacent the front axle. The vehicle frame in this case is spring supported from the front axle and the engine frame is connected to the vehicle frame, preferably by a cross tie by a universal joint, such as a ball and socket connection. In both constructions the radiator is mounted on the engine frame.

Another object and feature of my invention is to provide a low setting for the engine, the transmission, and the drive shaft to the rear axle, this being done by employing a curved bracket connected from the separate spring on the front axle or from the front cross tie on the vehicle frame so that the radiator and the engine are lowered a considerable distance below the normal level of the vehicle frame.

In this connection, another detailed object and feature relates to extending the radius rods of the engine frame to connect to the rear axle housing adjacent the brake drums, in which case these radius rods preferably pass underneath the side bars of the vehicle frame in a diagonal direction. As a modification I may carry the radius rods of the engine frame to special brackets attached to the rear axle housing entirely inside of the vehicle frame. By this latter construction, the design does not need to take into consideration the spring action of the vehicle and body.

Another detailed feature of my invention relates to mounting the fuel tank at the rear of the vehicle either on the vehicle frame or on the rearward extension of the engine frame.

With my type of motor suspension, the drive from the rear axle is communicated through the engine frame having the two radius rods and the drive shaft housing to the front axle through either the separate spring or the spring supporting the body frame and thence a direct thrusting action is conveyed to the front axle. The front axle, therefore, in effect, pulls the vehicle or body frame of the body of the car. This operates to give steadier running of the vehicle on rough or sandy roads and against wind pressure on the body.

My invention is illustrated in the accompanying drawings, in which:

Fig. 1 is a plan taken in the direction of the arrow 1 of Fig. 2.

Fig. 2 is a longitudinal section on the line 2—2 of Fig. 1 in the direction of the arrows, the engine and drive connection being illustrated in elevation.

Fig. 3 is a vertical transverse section on the line 3—3 of Fig. 1 in the direction of the arrows.

Fig. 4 is a detailed section on the line 4—4 of Fig. 1 in the direction of the arrows showing the connection to the rear axle housing.

Fig. 5 is a partial plan showing an alternative connection of the engine frame to the rear axle housing.

Fig. 6 is a partial vertical section showing an alternative spring connection of the engine frame to the spring mounted vehicle frame.

Referring first to the construction of Figs. 1 through 4 in which the front axle 11 is indicated as having a single transverse spring 12 connected thereto using spring shackles 13. In addition, there are vehicle suspension springs 14 attached to the front axle, these being illustrated as fore and aft semi-elliptical springs. The rear axle housing 15 has connected thereto the rear vehicle frame springs 16, these also being illustrated as semi-elliptical. These springs support the vehicle frame 17, which frame is indicated as having side beams 18 connected by cross members 19, 20, and 21. The connection to the rear springs of these beams is by means of double shackles 22 at both the front and the rear of the rear springs 16. The front springs are connected in the normal manner with a single shackle at the rear.

The engine frame 34 comprises a forward transverse bar 35 and two side rods 36, these being radius rods. Such rods are illustrated as connected at their rear ends by a rigid connection 37 to the brake housing 38 and hence to the rear axle housing 15. Such rods are illustrated as being formed of channels 39 and have a yoke 40 at the rear end connected to the channel, the arms of the yoke being secured to the brake housing. The single spring 12 in the front has a universal joint connection 41 to the engine frame. This universal joint has a ball housing 42 of which a lower member 43 is bolted to the transverse spring 12, and an upper member 44 bolted to the lower member encloses the ball 45. From this ball there is a strong bent neck construction 46 which is curved downwardly and riveted to the transverse bar 35. The engine 47 is rigidly secured at two forward points 48 and two rear points 49 to the radius rods of the engine frame, this giving a four point suspension for the motor.

The transmission housing 50 is indicated as connected to the engine housing, and a drive shaft housing 51 is rigidly connected to the transmission housing and to the differential housing 52 on the rear axle housing. The drive shaft 53 extends through the drive shaft housing directly from the transmission to the differential housing without any universal joint.

The radiator 54 is mounted directly on top of the transverse bar 35 of the engine frame and has the usual water connections to the engine. Therefore, the engine and the radiator are directly mounted on this separate engine frame. By this construction it will be seen that the engine frame is resiliently mounted on the front axle by its separate spring suspension, this being the single transverse spring 12. The main weight on this frame is at the front, this being the weight of the engine and the radiator so that this portion is spring suspended. The rear portion, however, of the engine frame is directly connected to the rear axle housing and has no spring suspension. Also, the rear portion of the drive shaft housing, as is the usual construction, is not spring supported.

In the construction of Fig. 1 through 4 the vehicle frame 17 is securely spring suspended by a separate set of springs having no connection whatever as far as resilience is concerned with the spring suspension of the engine frame and engine. The body may be mounted on the vehicle frame in the usual manner, and in these figures the tank 55 is illustrated as mounted in the vehicle frame. The fuel supply pipes may be carried forward by the vehicle frame and then have a flexible connection to the engine on the engine frame.

With this type of construction the vibration of the engine and any twist or torque developed thereby is communicated to the engine frame and thence to its own transverse spring 12. The engine frame, however, may oscillate slightly in the universal joint ball and socket connection between the front of the engine frame and its transverse suspending spring.

By this construction, and having spring shackles at both the front and rear of the rear springs connecting to the vehicle frame, the drive from the rear wheels and rear axle housing is communicated to the engine frame by means of the radius rods 36 and the drive shaft housing 51 and thence through the ball and socket connection to the transverse spring 12 and thereby to the front axle. The front axle and wheels hence obtain a direct thrust or pushing action from the rear wheels. This adds to a steady operation on rough roads or in sand and facilitates the steering of the vehicle. As the vehicle body is mounted on the vehicle frame separate from the engine resilient mounting, the wind action and air resistance to the vehicle body exerts a rearward pull on the front axle so that the front axle may be considered as pulling the vehicle frame and the body thereon. This construction adds to the steadiness of the vehicle in heavy front or cross winds or at high speed of travel. It is to be also noted by my construction that the engine is set low relative to the vehicle frame and thus materially lowers the center of gravity of the vehicle as a whole.

In Fig. 5 I have illustrated a modified connection of the radius rods 36 of the engine frame to the rear axle housing. In this case substantial collars 56 are secured to the rear axle housing, this being a rigid connection, and the radius rods through the medium of their yokes have a rigid bolted or riveted connection to these collars. This illustration of Fig. 5 shows the tank 55 mounted on an extension frame 57 of the engine frame. The tank, therefore, in this case, is not spring suspended, although, if desired, separate springs might be used to carry the weight of the tank.

In Fig. 6 I show an alternative construction in which the transverse spring 12 is omitted and a substantial cross bar 58 extends between the vehicle frame bars 18 substantially directly over the front axle. This bar may be substituted for the bar 19 illustrated in Fig. 1 as in front of the axle. In this construction the universal joint 59 is illustrated as having one socket member 60 secured to the bar 58 which is channel-like in shape. A cap 61 is secured thereto and the ball 62 is fitted in this socket. A curved neck 63 extends downwardly and has a substantial bracket 64 connected to the cross bar 35 of the engine frame. With this mounting the engine frame has the same radius rods 36 which may be connected either inside the vehicle frame as shown in Fig. 5 or to the brake housing as shown in Figs. 1, 2, and 4. With this arrangement, the engine frame has a resilient spring support at the front axle, these being, however, the same springs which carry the front of the vehicle frame, but on account of the ball and socket connection very little of the engine vibration and torsional twist are conveyed to the vehicle frame. With this type of mounting I prefer to have the rear springs connected to the vehicle frame by double shackles. The drive by this construction of Fig. 6 is through the engine housing to the forward portion of the vehicle frame and hence by the spring suspension to the front axle. The operation and action is very much the same as above described in connection with Figs. 1 through 4.

Various changes may be made in the details of construction without departing from the scope of the invention as defined by the appended claims.

I claim:

1. A motor vehicle having a front axle with a transverse spring, a rear axle housing with a drive axle therein, an engine frame having a single and central universal jointed connection at the front to said spring and having radius rods rigidly connected to the rear axle housing, an engine and radiator mounted on the engine frame at the forward portion thereof, and a drive shaft from the engine to the drive axle.

2. A motor vehicle as claimed in claim 1, the drive shaft from the engine to the drive axle being continuous without universal joints, and a drive shaft housing rigidly secured to the engine and to the rear axle housing.

3. A motor vehicle as claimed in claim 1, the rear axle housing having springs, the front axle having springs, and a vehicle frame connected to said latter springs, the rear axle springs having a connection to the vehicle frame with a shackle at each end of each spring.

4. In a motor vehicle having a front axle with a transverse spring and a pair of front to rear springs, a rear axle housing having a drive axle and a pair of front to rear springs, an engine frame having a universal jointed connection at the front to the transverse spring and having radius rods rigidly connected to the rear axle housing, an engine and a radiator mounted on the engine frame, a drive shaft connection from the engine to the drive axle, and a vehicle frame secured to the front to rear springs, the rear axle springs having shackles at each end, the engine frame at the front being housed between the sides of the vehicle frame.

5. In a motor vehicle having a front axle with a transverse spring and a pair of front to rear springs, a rear axle housing having a drive axle therein and a pair of front to rear springs with shackles at each end of said latter springs, an engine frame having a front crossbar with a ball and socket connection to the transverse spring, and a pair of radius rods extending from said bar to a rigid connection in the rear axle housing, an engine and radiator mounted in the forward portion of the engine frame, a drive shaft housing between the engine and the rear axle housing with a drive shaft extending therethrough, and a vehicle frame having side beams connected to the fore and aft springs, such connection at the rear being through the shackles of the rear springs.

WILLIAM H. C. RICHMAN.